(12) United States Patent
Hishida et al.

(10) Patent No.: US 11,190,073 B2
(45) Date of Patent: Nov. 30, 2021

(54) MOTOR HAVING INCREASED PASSAGE FOR REFRIGERANT FOR COOLING COILS

(71) Applicant: Panasonic Intellectual Property Management Co., Ltd., Osaka (JP)

(72) Inventors: Mitsuoki Hishida, Osaka (JP); Yuichi Yoshikawa, Osaka (JP); Hirokazu Yamauchi, Osaka (JP); Keiichiro Nukada, Nara (JP)

(73) Assignee: PANASONIC INIELLECTUAL PROPERTY MANAGEMENT CO., LTD., Osaka (JP)

( * ) Notice: Subject to any disclaimer, the term of this patent is extended or adjusted under 35 U.S.C. 154(b) by 258 days.

(21) Appl. No.: 16/483,057

(22) PCT Filed: Dec. 20, 2017

(86) PCT No.: PCT/JP2017/045648
§ 371 (c)(1),
(2) Date: Aug. 2, 2019

(87) PCT Pub. No.: WO2018/154944
PCT Pub. Date: Aug. 30, 2018

(65) Prior Publication Data
US 2020/0235625 A1    Jul. 23, 2020

(30) Foreign Application Priority Data
Feb. 21, 2017    (JP) .............................. JP2017-030160

(51) Int. Cl.
*H02K 3/24*    (2006.01)
*H02K 1/20*    (2006.01)
(Continued)

(52) U.S. Cl.
CPC ................. *H02K 3/24* (2013.01); *H02K 1/20* (2013.01); *H02K 3/18* (2013.01); *H02K 5/20* (2013.01); *H02K 9/19* (2013.01)

(58) Field of Classification Search
CPC .. H02K 1/06; H02K 1/08; H02K 1/12; H02K 1/20; H02K 3/04; H02K 3/12; H02K 3/18;
(Continued)

(56) References Cited

U.S. PATENT DOCUMENTS 3,777,190 A  * 12/1973  Guimbal ................. H02K 3/24
                                                          310/60 R
2011/0215660 A1* 9/2011  Goto ...................... H02K 3/522
                                                          310/53
(Continued)

FOREIGN PATENT DOCUMENTS

DE        2617661 A1    11/1977
DE      102012212637      1/2014
(Continued)

OTHER PUBLICATIONS

The Extended European Search Report dated Dec. 17, 2019 for the related European Patent Application No. 17898270.8.
(Continued)

*Primary Examiner* — Alex Torres-Rivera
*Assistant Examiner* — David A. Singh
(74) *Attorney, Agent, or Firm* — McDermott Will and Emery LLP

(57) ABSTRACT

A motor includes a stator including a stator core and teeth respectively protruding from the stator core, and coils respectively wound onto the teeth n (n is an integer of 1 or greater) turns including first to n-th turns. The coils are each made from a conductive member having a polygonal cross section. On a cross section obtained when one of the coils is
(Continued)

cut in a corresponding one of directions of protrusion of the teeth from the stator core, the one of the coils includes a recess on at least either a first opposing surface representing an opposing surface to a corresponding one of the teeth or a second opposing surface representing an opposing surface to another one of the coils, which is wound onto adjacent one of the teeth. A space allowing refrigerant used for cooling the coils to pass through is provided between the recess and at least either the first opposing surface or the second opposing surface.

7 Claims, 7 Drawing Sheets

(51) Int. Cl.
*H02K 3/18* (2006.01)
*H02K 9/19* (2006.01)
*H02K 5/20* (2006.01)

(58) Field of Classification Search
CPC .. H02K 3/22; H02K 3/24; H02K 5/04; H02K 5/20; H02K 9/19; H02K 9/193; H02K 9/197; H02K 9/20; H02K 2209/00
USPC .................................................. 310/52, 54
See application file for complete search history.

(56) References Cited

U.S. PATENT DOCUMENTS

| | | | |
|---|---|---|---|
| 2012/0175977 A1* | 7/2012 | Beatty | H02K 3/24 310/58 |
| 2012/0313477 A1* | 12/2012 | Haga | H02K 3/522 310/208 |
| 2016/0028284 A1* | 1/2016 | Dajaku | H02K 3/24 310/54 |
| 2017/0047795 A1* | 2/2017 | Klassen | H02K 1/02 |
| 2017/0063200 A1* | 3/2017 | Tremelling | H02K 3/38 |
| 2018/0191208 A1* | 7/2018 | Kubo | H02K 1/04 |
| 2018/0269757 A1* | 9/2018 | Fiederling | H02K 3/18 |
| 2021/0091623 A1* | 3/2021 | Takahashi | H02K 3/38 |
| 2021/0143693 A1* | 5/2021 | Nehl | B60K 11/02 |

FOREIGN PATENT DOCUMENTS

| | | |
|---|---|---|
| JP | 60-024161 U | 2/1985 |
| JP | 60-024162 U | 2/1985 |
| JP | 60-059762 U | 4/1985 |
| JP | 2004-096907 | 3/2004 |
| JP | 2012-100433 A | 5/2012 |
| JP | 2015-109733 | 6/2015 |

OTHER PUBLICATIONS

International Search Report of PCT application No. PCT/JP2017/045648 dated Mar. 13, 2018.

* cited by examiner

MOTOR HAVING INCREASED PASSAGE FOR REFRIGERANT FOR COOLING COILS

TECHNICAL FIELD

The technique disclosed herein relates to a structure of coils in a motor.

BACKGROUND ART

Industry motors and on-vehicle motors have been highly demanded in recent years. In particular, a low cost but highly efficient motor has been demanded.

As a method for improving efficiency of a motor, increasing a space factor of coils respectively disposed within slots of a stator has been known. Increasing a space factor of coils can suppress a loss due to a current flowing into the coils when a motor is driven.

As a method for increasing a space factor of coils, such a configuration has been proposed that molded coils made of a copper material are respectively disposed within slots (e.g., see PTL 1).

Heat is a factor of lowering efficiency of a motor. Such a method is known that refrigerant is allowed to circulate in a motor to suppress a rise in temperature (e.g., see PTL 2).

As a space factor of coils increases, an empty space in slots reduces, disallowing refrigerant to easily flow in the slots. As a result, heat easily accumulates in the coils or teeth respectively wound with the coils, reducing efficiency of a motor.

CITATION LIST

Patent Literature

PTL 1: Unexamined German Patent Publication No. 102012212637
PTL 2: Unexamined Japanese Patent Publication No. 2015-109733

SUMMARY OF THE INVENTION

In view of the problems described above, the technique disclosed herein has an object of further increasing effects of cooling coils with refrigerant to achieve a highly efficient motor.

To achieve the object described above, a motor according to the technique disclosed herein includes a stator including a stator core and teeth respectively protruding from the stator core, and coils respectively wound onto the teeth n (n is an integer of 1 or greater) turns including first to n-th turns. The coils are each made from a conductive member having a polygonal cross section. On a cross section obtained when one of the coils is cut in a corresponding one of directions of protrusion of the teeth from the stator core, the one of the coils includes a recess on at least either a first opposing surface representing an opposing surface to a corresponding one of the teeth or a second opposing surface representing an opposing surface to another one of the coils, which is wound onto adjacent one of the teeth. A space allowing refrigerant used for cooling the coils to pass through is provided between the recess and at least either the first opposing surface or the second opposing surface.

With the configuration, the passage for the refrigerant, which is provided adjacent to the coils where heat easily accumulates, can increase effects of cooling the coils. A highly efficient motor can therefore be achieved.

In the motor, at least one of corners of a k-th (k is an integer, $1 \leq k \leq n$) turn of each of the coils may be formed into a cut-away part to provide a recess.

With the configuration, without greatly reducing the coils in cross-sectional area, a passage for refrigerant can be provided.

In the motor, at least either a center portion of the first opposing surface or a center portion of the second opposing surface of the k-th (k is an integer, $1 \leq k \leq n$) turn of each of the coils may have a cut-away shape to provide a recess.

With the configuration, without greatly reducing the coils in cross-sectional area, a passage for refrigerant can be provided.

At least two of turns of each of the coils may be provided with recesses.

In the motor, one of the turns, which at least lies adjacent to the stator core, of each of the coils may be provided with a recess.

With the configuration where a passage for refrigerant is provided on one of the turns, which lies adjacent to the stator core lying at a most distant position from the passage for the refrigerant, the coils can be efficiently cooled.

The second opposing surface of each of the turns of each of the coils may include a plurality of recesses.

With the configuration, a surface area of each of the coils can be increased, further increasing effects of cooling the coils.

The refrigerant may be liquid.

According to the present disclosure, effects of cooling the coils with the refrigerant can be increased, achieving a highly efficient motor.

DESCRIPTION OF EMBODIMENT

An exemplary embodiment will be described herein in detail with reference to the accompanying drawings. The preferable exemplary embodiment described below is a substantially mere example, and does not intend to limit the present invention, applications, and purposes.

(Exemplary Embodiment)
(Motor Structure)

Figure 1A:
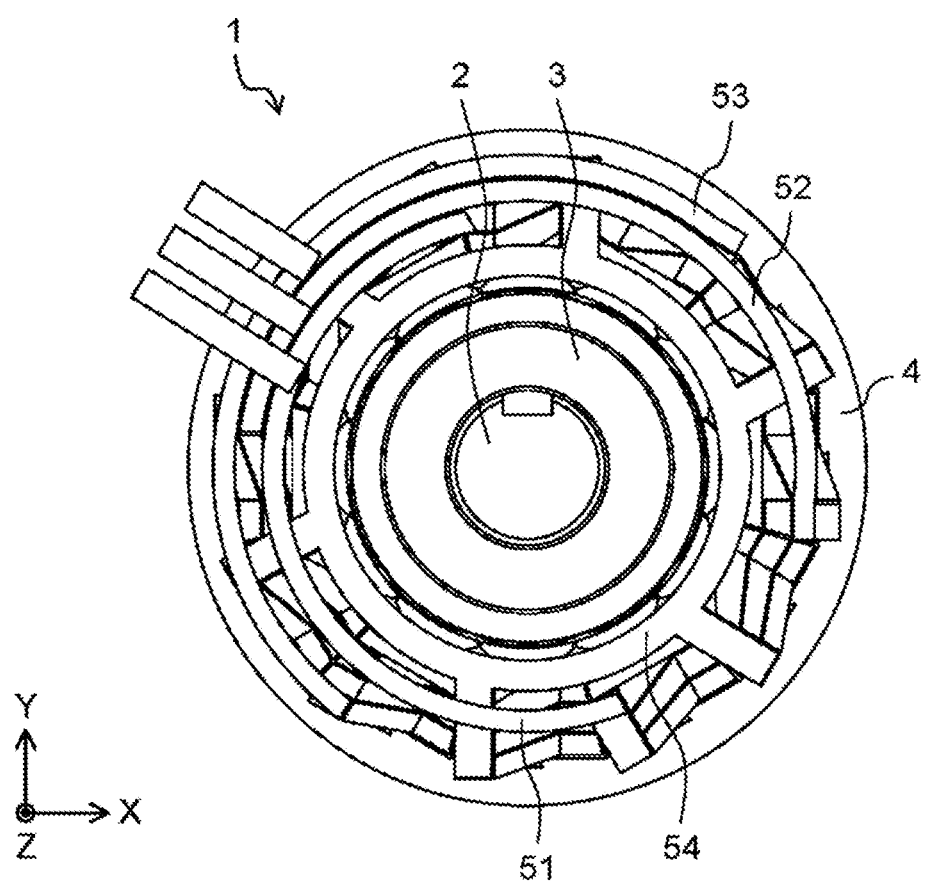
FIG. 1A is a top view illustrating a motor according to an exemplary embodiment.
Figure 1B:
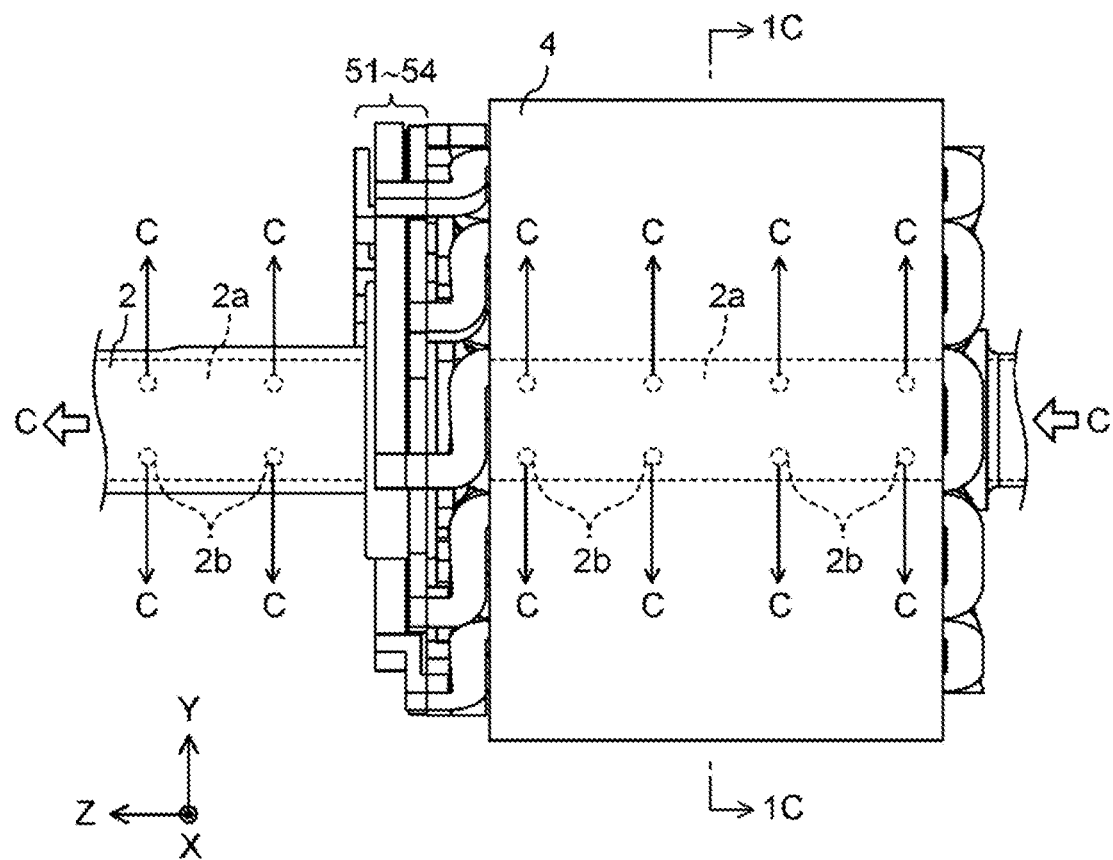
FIG. 1B is a side view illustrating the motor according to the exemplary embodiment.
Figure 1C:
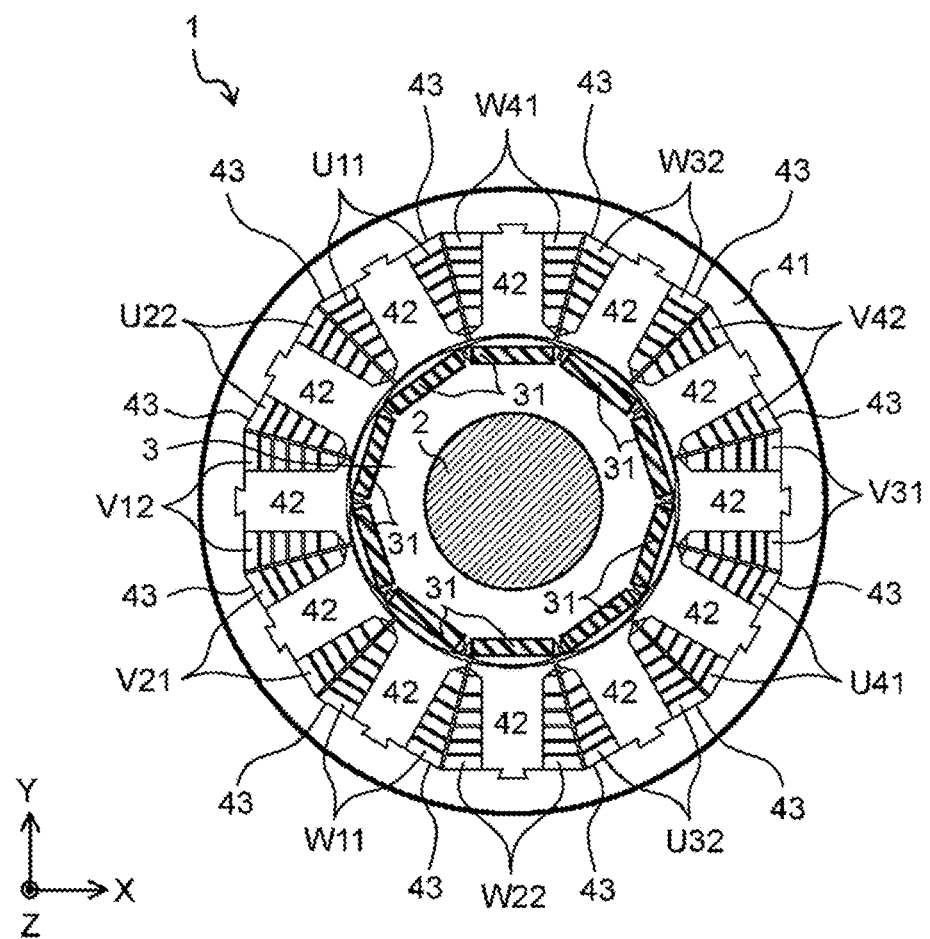
FIG. 1C is a cross-sectional view taken along line 1C-1C in FIG. 1B.

FIG. 1A is a top view illustrating motor 1 according to an exemplary embodiment. FIG. 1B is a side view illustrating motor 1 according to the exemplary embodiment. FIG. 1C is a cross-sectional view taken along line 1C-1C in FIG. 1B. However, the views do not illustrate a cover case, for example. In FIG. 1C, only a main part is illustrated as a hatched cross section. Inside of the cover case (not illustrated), motor 1 includes shaft 2, rotor 3, stator 4, coils U11 to U41, V12 to V42, and W11 to W41, and bus bars 51 to 54.

In here, a longer direction (a direction vertical to a paper plane of FIG. 1A) of shaft 2 is referred to as a Z-axis direction. Directions orthogonal to the Z-axis direction (directions parallel to the paper plane of FIG. 1A) are respectively referred to as an X-axis direction and a Y-axis direction. The X-axis direction and the Y-axis direction are orthogonal to each other.

A term "integrated" or "integrally" denotes a state of an object where not only a plurality of constituent parts are mechanically coupled with each other with bolts or through caulking, for example, but also a plurality of constituent parts are electrically coupled with each other through material coupling such as covalent coupling, ion coupling, or metal coupling, for example, or a plurality of constituent parts are electrically coupled with each other through material coupling after all of the constituent parts are melted.

Shaft 2 internally includes hollow part 2a extending in the Z-axis direction. A plurality of through holes 2b are provided on a side surface of shaft 2. Hollow part 2a serves as a passage for refrigerant C used to cool inside of motor 1. Refrigerant C flows inside of hollow part 2a in the Z-axis direction. With an externally provided pump, for example (not illustrated), refrigerant C circulates and flows inside of motor 1. Some of refrigerant C flowing inside of hollow part 2a flows from the plurality of through holes 2b outward from around a center of motor 1, i.e., flows from rotor 3 toward stator 4, to cool rotor 3 and stator 4.

Rotor 3 is provided to abut an outer circumference of shaft 2. Rotor 3 includes magnets 31 each facing stator 4. Magnets 31 respectively have N-poles and S-poles alternately disposed in an outer circumference direction of shaft 2. In the exemplary embodiment, neodymium magnets are used as magnets 31 used in rotor 3. However, a material and a shape of each of magnets 31 can be appropriately changed in accordance with an output of a motor, for example.

Stator 4 includes stator core 41 having a substantially annular shape, a plurality of teeth 42 provided on an inner circumference of stator core 41 at equal intervals, and slots 43 respectively provided between teeth 42. When viewed in the Z-axis direction, stator 4 is disposed outside of rotor 3 to be away from rotor 3 at a certain gap.

Stator core 41 is die-cut and formed from electromagnetic steel sheets containing silicon, for example, and laminated to each other, for example.

In the exemplary embodiment, rotor 3 includes a total of ten magnetic poles, including five N-poles and five S-poles facing stator 4. A number of slots 43 is 12. However, a number of magnetic poles of rotor 3 and a number of slots 43 are not limited to the numbers described above. A combination of another number of magnetic poles and another number of slots is also applicable.

Stator 4 includes 12 coils U11 to U41, V12 to V42, and W11 to W41. Each of coils U11 to U41, V12 to V42, and W11 to W41 is attached to a corresponding one of teeth 42, and disposed in a corresponding one of slots 43 when viewed in the Z-axis direction. That is, coils U11 to U41, V12 to V42, and W11 to W41 are respectively wound in a concentrated manner with respect to teeth 42. Furthermore, coils U11 to U41 are integrally disposed to bus bar 51, coils V12 to V42 are integrally disposed to bus bar 52, and coils W11 to W41 are integrally disposed to bus bar 53.

In each of symbols UPQ, VPQ, and WPQ representing the coils, a first letter represents one of phases of motor 1 (one of U-phase, V-phase, and W-phase in the exemplary embodiment). A second letter represents an order of arrangement of a corresponding one of the coils in the one of the phases. A third letter represents a direction of winding of the corresponding one of the coils. In the exemplary embodiment, 1 represents a clockwise direction, and 2 represents a counterclockwise direction. Therefore, coil U11 represents a first coil in an order of arrangement in the U-phase, and a direction of winding is the clockwise direction. Coil V42 represents a fourth coil in an order of arrangement in the V-phase, and a direction of winding is the counter clockwise direction. A term "clockwise" denotes right-handed rotation when viewed from the center of motor 1. A term "counterclockwise" denotes left-handed rotation when viewed from the center of motor 1.

Specifically, coils U11, U41 are U-phase coils, whereas coils U22, U32 are U-bar-phase (a direction of a magnetic field is opposite to a direction of a magnetic field generated from a U-phase coil) coils. However, the coils will be collectively referred to as U-phase coils unless otherwise specified. Similarly, coils V12 to V42 and coils W11 to W41 will be respectively collectively referred to as V-phase coils and W-phase coils.

(Features of Coil Cross Section)

Figure 2:
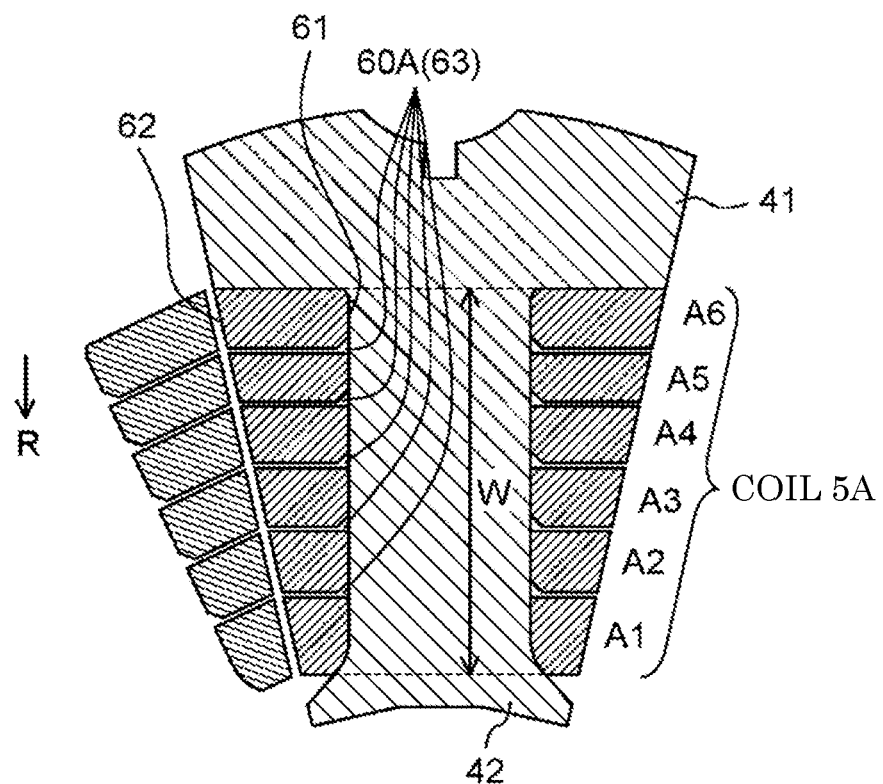
FIG. 2 is a partial enlarged view of FIG. 1C.

FIG. 2 is a partial enlarged view of the cross-sectional view of FIG. 1C. FIG. 2 illustrates one of teeth 42 respectively protruding from stator core 41, and coil 5A wound onto the one of teeth 42. Stator core 41 lies on an outer side of the motor. Teeth 42 lie adjacent to the center of the motor. Coil 5A corresponds to one of coils U11 to U41, V12 to V42, and W11 to W41 illustrated in FIG. 1C. Coil 5A is mainly made of one of materials including copper, aluminum, zinc, magnesium, brass, iron, and steel use stainless (SUS), for example.

Each of the directions of protrusion of teeth 42 from stator core 41 is herein referred to as an R direction. FIG. 2 illustrates a cross section in the R direction. In FIG. 2, coil 5A is wound onto the one of teeth 42 six turns. A1 to A6 respectively represent cross sections at a first turn to a sixth turn of coil 5A. Symbols A1 to A6 may respectively represent cross-sectional areas at A1 to A6.

In the exemplary embodiment, each of the turns of each of coils 5A has a substantially trapezoidal cross-sectional shape, and further has, adjacent to each of teeth 42, in the R direction, a cut-away part having such a shape that corner 60A lying adjacent to a center of motor 1 is C-chamfered. The cut-away part has such a shape that corner 60A is linearly cut away. A space defined by each of teeth 42 and corner 60A has a substantially triangular shape. The space functions as a passage for refrigerant C flowing in stator 4. In other words, opposing surfaces 61 of each of coils 5A face each of teeth 42, and a plurality of recesses 63 are provided. A side surface of each of teeth 42 and recesses 63 define the passage for refrigerant C.

With the configuration described above, the passage for refrigerant C can be secured around each of coils 5A where heat easily accumulates, efficiently cooling coils 5A. On each of the turns of each of coils 5A, corner 60A has such a shape that is C-chamfered. Without greatly reducing each of coils 5A in cross-sectional area, a space factor of coils 5A can be maintained. This can increase efficiency of motor 1. In each of the turns of each of coils 5A, corner 60A has such a shape that is C-chamfered. Recesses 63 can each be expanded in area, compared with a case where corner 60A has such a shape that is rounded and R-chamfered. The passage for refrigerant C can thus be secured, efficiently cooling coils 5A.

Figure 3A:
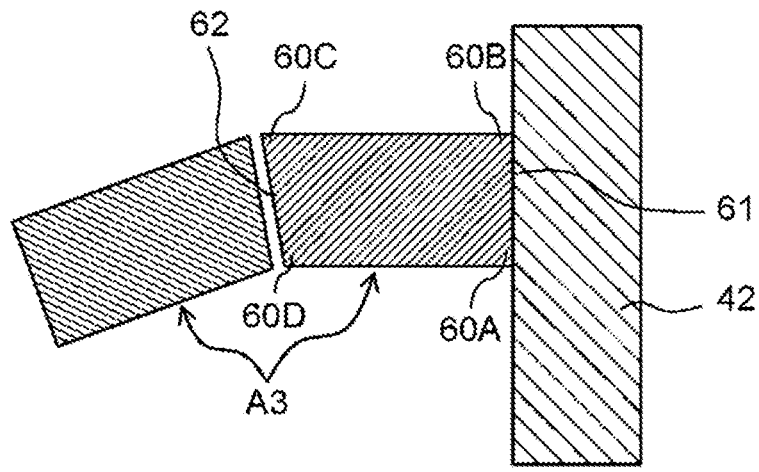
FIG. 3A is a view illustrating another cross section of one of teeth and coils of the motor according to the exemplary embodiment.
Figure 3B:
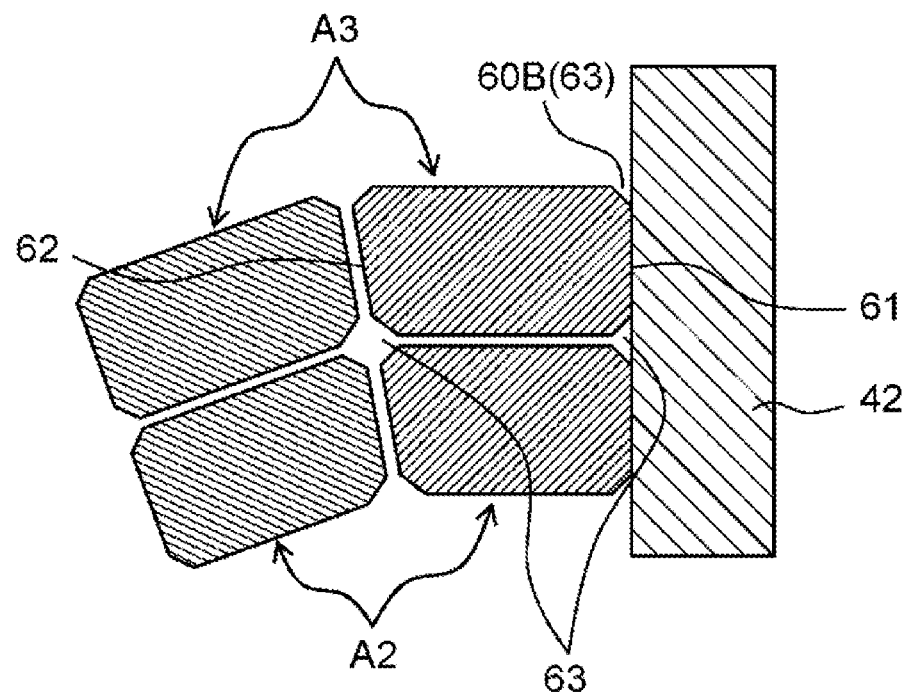
FIG. 3B is a view illustrating still another cross section of one of teeth and coils of the motor according to the exemplary embodiment.

FIG. 3A is a view illustrating another cross section of one of teeth 42 and coils 5A of motor 1 according to the exemplary embodiment. FIG. 3A illustrates third turn A3 of one of coils 5A, third turn A3 of another adjacent one of coils 5A, and a corresponding one of teeth 42. Similar to FIG. 2, each of turns of each of coils 5A has a substantially trapezoidal cross section. Third turn A3 of each of coils 5A has four corners 60A to 60D. FIG. 3B is a view illustrating still another cross section of one of teeth 42 and coils 5A of motor 1 according to the exemplary embodiment. FIG. 3B illustrates second and third turns A2, A3 of one of coils 5A, second and third turns A2, A3 of another adjacent one of coils 5A, and a corresponding one of teeth 42. Four corners 60A to 60D are all each formed into a cut-away part having such a shape that is C-chamfered. For convenience of description, third turns A3 only or second turns A2 and third turns A3 only of coils 5A are illustrated. Similar shapes can however be applied to other turns.

FIG. 2 illustrates an example where only corner 60A among four corners is formed into a cut-away part. If corner 60B lying on opposing surface 61 to each of teeth 42 is however formed into a cut-away part having such a shape that is C-chamfered, the passage for refrigerant C is further expanded, increasing efficiency of cooling coils 5A. When each of coils 5A has a substantially trapezoidal cross-sectional shape, and a space factor of coils 5A in slots 43 is increased, a space within slots 43 reduces, disallowing refrigerant C to easily flow. In particular, opposing surfaces 61 of each of coils 5A and a corresponding one of teeth 42 lie closer to each other. Almost no refrigerant C flows. With a different shape of corner 60A or 60B, however, the passage for refrigerant C is secured. Coils 5A and teeth 42 can thus be cooled.

On the other hand, a gap is often provided between coils 5A adjacent to each other. Refrigerant C can thus easily flow, compared with a case where refrigerant C flows between each of coils 5A and each of teeth 42. When corners 60C, 60D on each of opposing surfaces 62 of coils 5A adjacent to each other are each formed into a cut-away part, however, the passage for refrigerant C between coils 5A, 5A adjacent to each other can further be expanded. Contact surfaces with refrigerant C simultaneously increase. Efficiency of cooling coils 5A thus increases. As illustrated in FIG. 3B, with four corners 60A to 60D all each formed into a cut-away part having such a shape that is C-chamfered, effects of cooling coils 5A and teeth 42 with refrigerant C can therefore further be increased.

As described above, depending on positions of corners when the corners are each formed into a cut-away part, effects of cooling coils differ. Even when at least one of corners is changed in shape, however, cooling of coils with refrigerant is facilitated. Whether which of corners 60A to 60D is changed in corner shape can be appropriately changed in accordance with capability required for motor 1, an environment of use of motor 1, and an upper limit temperature required for coils 5A, or a set space factor of coils 5A, for example. When, among corners 60A to 60D, corners 60A, 60B lying on opposing surface 61 to each of teeth 42 are changed in shape, the passage for refrigerant C is secured, more preferably cooling coils 5A and teeth 42.

All the corners of each of the turns of each of coils 5A may each have a shape illustrated in FIG. 2 or 3B, for example. Only some of the turns may each have the shape illustrated in FIG. 2 or 3B. For example, a side of each of coils, which is closer to stator core 41, will be less cooled than a side adjacent to the center of motor 1, around which refrigerant C flows. Only at least one of the corners of the fifth or sixth turn may therefore be formed into a cut-away part having a C-chamfered shape. Whether which of corners of a turn is changed in shape can be appropriately changed in accordance with capability required for motor 1, an environment of use of motor 1, and an upper limit temperature required for coils 5A, or a set space factor of coils 5A, for example. To keep a current density constant in coils 5A, it is preferable that turns are formed identical to each other in cross-sectional area. A predetermined turn may be changed in corner shape to form turns identical to each other in cross-sectional area. In other words, in each of coils 5A respectively wound onto teeth 42 $n$ (n is an integer of 1 or greater) turns, coils 5A may each be made from a conductive member having a polygonal cross section. In a cross section when each of coils 5A is cut in the R direction representing each of the directions of protrusion of teeth 42 from stator core 41, each of coils 5A may have recesses 63 on at least either opposing surface 61 to a corresponding one of teeth 42 or opposing surface 62 to coil 5A wound onto an adjacent one of teeth 42. Recesses 63 and at least either opposing surface 61 or opposing surface 62 may form a space allowing refrigerant C for cooling coils 5A to pass through. At least one of corners of a k-th (k is an integer, 1≤k≤n) turn of each of coils 5A may be formed into a cut-away part to provide recess 63.

As described above, motor 1 according to the exemplary embodiment includes stator 4 including stator core 41 and teeth 42 respectively protruding from stator core 41, and coils 5A respectively wound onto teeth 42 $n$ (n is an integer of 1 or greater) turns including first to n-th turns. Coils 5A are each made from a conductive member having a polygonal cross section. On a cross section obtained when one of coils 5A is cut in a corresponding one of the R directions of protrusion of teeth 42 from stator core 41, the one of coils 5A includes recess 63 on at least either a first opposing surface representing opposing surface 61 to a corresponding one of teeth 42 or a second opposing surface representing opposing surface 62 to another one of coils 5A, which is wound onto adjacent one of teeth 42. Recess 63 and at least either the first opposing surface corresponding to opposing surface 61 or the second opposing surface corresponding to opposing surface 62 define a space allowing refrigerant C for cooling coils 5A to pass through.

With the configuration, a passage for refrigerant C, which is provided adjacent to coils 5A where heat easily accumulates, can increase effects of cooling coils 5A. Highly efficient motor 1 can therefore be achieved.

In motor 1, at least one of the corners of the k-th (k is an integer, 1≤k≤n) turn of each of coils 5A may be formed into a cut-away part to provide recess 63.

With the configuration, without greatly reducing coils 5A in cross-sectional area, the passage for refrigerant C can be provided.

In motor 1, at least either the center portion of the first opposing surface corresponding to opposing surface 61 or the center portion of the second opposing surface corresponding to opposing surface 62 of the k-th (k is an integer, 1≤k≤n) turn of each of coils 5A may have a cut-away shape to provide recess 63.

With the configuration, without greatly reducing coils 5A in cross-sectional area, the passage for refrigerant C can be provided.

At least two of the turns of each of coils 5A may be provided with recesses 63.

In motor 1, one of the turns, which at least lies adjacent to stator core 41, of each of coils 5A may be provided with recess 63.

With the configuration where the passage for refrigerant C is provided on one of the turns, which lies adjacent to stator core 41 lying at a most distant position from the passage for refrigerant C, coils 5A can be efficiently cooled.

Modification Example 1

Figure 4A:
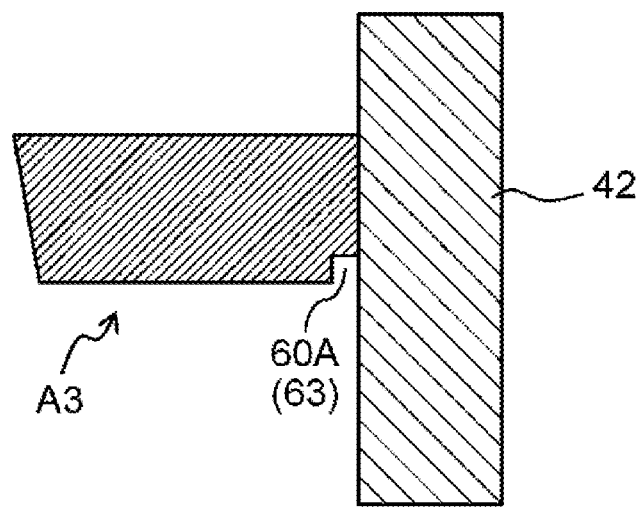
FIG. 4A is a view illustrating a cross section of one of teeth and one of coils according to modification example 1.
Figure 4B:
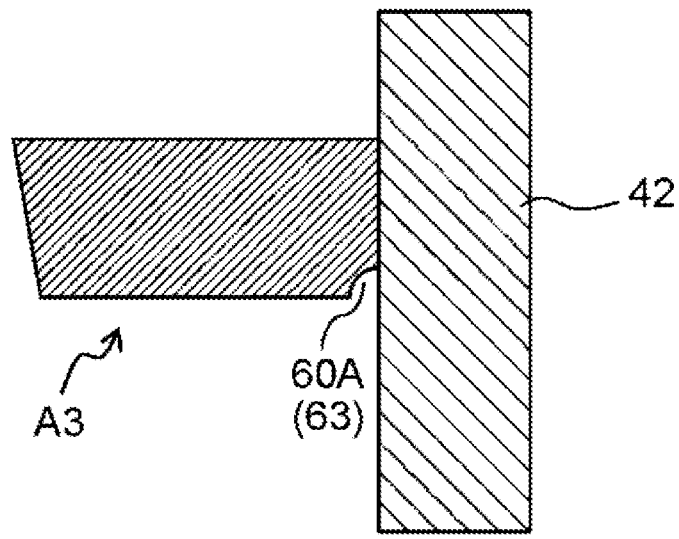
FIG. 4B is a view illustrating another cross section of one of teeth and one of coils according to modification example 1.
Figure 4C:
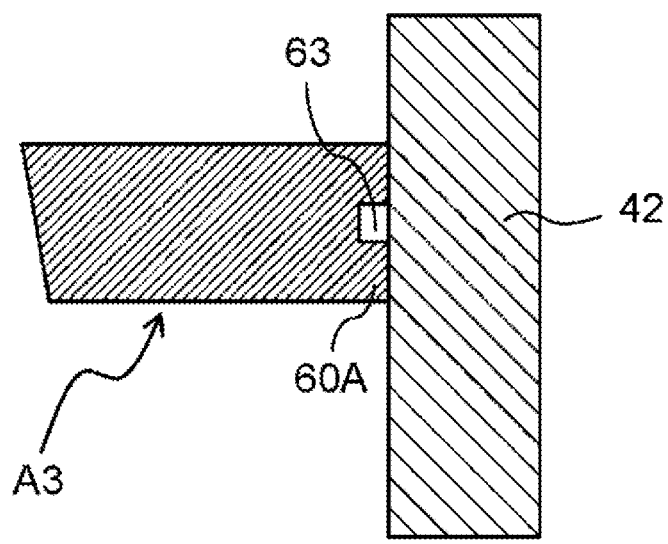
FIG. 4C is a view illustrating still another cross section of one of teeth and one of coils according to modification example 1.

The shape of each of corners 60A to 60D is not limited to a C-chamfered shape, but may be a desired shape. FIG. 4A is a view illustrating a cross section of one of teeth 42 and one of coils 5A according to modification example 1. FIG. 4B is a view illustrating another cross section of one of teeth 42 and one of coils 5A according to modification example 1. FIG. 4C is a view illustrating still another cross section of one of teeth 42 and one of coils 5A according to modification example 1. FIGS. 4A to 4C illustrate corners 60A or recesses 63 respectively having different shapes. For example, as illustrated in FIG. 4A, corner 60A may be formed into a cut-away part having a substantially rectangular cut-away shape to provide recess 63. As illustrated in FIG. 4B, corner 60A may be formed into a cut-away part having a substantially quadrant cut-away shape to allow an arc to face inward of each of coils 5A to provide recess 63. Furthermore, as illustrated in FIG. 4C, in each of the turns of each of coils 5A, the center portion of opposing surface 61 is formed to have a substantially rectangular cut-away shape to provide recess 63. The center portion may otherwise be cut away into a polygonal shape such as a substantially semicircular shape or a triangular shape. Furthermore, the center portion of opposing surface 62 may be formed into a substantially rectangular cut-away shape, a substantially semicircular cut-away shape, or a polygonal cut-away shape to provide recess 63. The center portion of opposing surface 61 and the center portion of opposing surface 62 may each be formed into a substantially rectangular cut-away shape, a substantially semicircular cut-away shape, or polygonal cut-away shape to provide recess 63.

In each of the cases, coils 5A each slightly reduce in cross-sectional area, compared with the cases in FIGS. 2 to 3B. The passage for refrigerant C can however expand in area, increasing effects of cooling coils 5A.

Whether which part is formed into a cut-away part on each of corners 60A to 60D of each of coils 5A, or whether which corner is formed into a cut-away part on each of the turns of each of coils 5A can be appropriately changed similarly as described above in accordance with capability required for motor 1, an environment of use of motor 1, and an upper limit temperature required for coils 5A, or a set space factor of coils 5A, for example.

Furthermore, whether which center portion of one of turns of each of the turns of each of coils 5A is provided with recess 63 having a substantially rectangular cut-away shape, a substantially semicircular cut-away shape, or a polygonal cut-away shape can be appropriately changed similarly as described above in accordance with capability required for motor 1, an environment of use of motor 1, and an upper limit temperature required for coils 5A, or a set space factor of coils 5A, for example. As illustrated in FIG. 2, 3B, 4A, or 4B, coils 5A may each be changed in corner shape, and simultaneously, recess 63 having a cut-away shape may be provided at the center portion of at least one the turns of each of coils 5A.

In other words, at least one of the corners of the k-th (k is an integer, 1≤k≤n) turn of each of coils 5A may be formed into a cut-away part to provide recess 63. At least either the center portion of opposing surface 61 or the center portion of opposing surface 62 on the k-th turn of each of coils 5A may be formed into a cut-away shape to provide recess 63.

Modification Example 2

Figure 5:
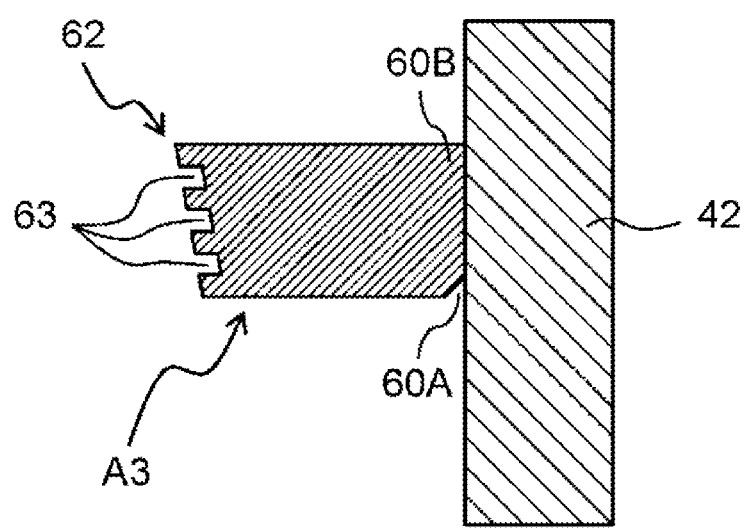
FIG. 5 is a view illustrating a cross section of one of teeth and one of coils according to modification example 2.

FIG. 5 is a view illustrating a cross section of one of teeth 42 and one of coils 5A according to modification example 2. FIG. 5 illustrates third turn A3 of each of coils 5A and a corresponding one of teeth 42. As illustrated in FIG. 5, opposing surface 62 of one of coils 5A faces adjacent one of coils 5A, and is provided with a plurality of recesses 63. As described above, refrigerant C easily flows between coils 5A adjacent to each other, compared with a case where refrigerant C flows between each of coils 5A and each of teeth 42. The plurality of recesses 63 provided on opposing surface 62, increasing surface areas of parts that come into contact with refrigerant C. Efficiency of cooling coils 5A thus further increases. Even when corners 60C, 60D lying on opposing surface 62 are each formed into a cut-away part, surface areas on opposing surface 62 can be increased.

An uneven shape of opposing surface 62 is not limited to have the shape illustrated in FIG. 5. Whether a plurality of recesses 63 are provided on opposing surface 62 of each of turns of each of coils 5A or a plurality of recesses 63 are provided on opposing surface 62 of each of some of the turns can be appropriately changed in accordance with capability required for motor 1, an environment of use of motor 1, and an upper limit temperature required for coils 5A, or a set space factor of coils 5A, for example.

The shape of opposing surface 62 illustrated in FIG. 5 is applicable to the configurations illustrated in FIG. 2, 3A, 3B, or 4A to 4C.

As described above, the second opposing surface corresponding to opposing surface 62 of each of the turns of each of the coils according to modification example 2 may have a plurality of recesses.

With the configuration, a surface area of each of the coils can be increased, further increasing effects of cooling the coils.

In the exemplary embodiment, the number of turns of each of the coils is specified to, but not limited to, six. The number of turns of each of the coils can be however appropriately changed in accordance with a size or capability, for example, of motor 1.

In the exemplary embodiment, each of coils 5A has a substantially trapezoidal cross-sectional shape, but may have another quadrangular shape such as a substantially rectangular shape. The shape may not be limited to the quadrangular shape, but may be another polygonal shape.

Corners 60A to 60D of each of coils 5A may be actually C-chamfered through forming or cutting, for example, or may be cut away to form a cut-away part. To collectively form coils 5A through molding, for example, corners 60A to 60D may each be formed, in molds, for example, beforehand, into a C-chamfered cut-away shape, a polygonal cut-away shape, or a substantially quadrant cut-away shape. This similarly applies to a case where the center portion of each of the turns of each of coils 5A is formed into a polygonal cut-away shape or a substantially semicircular cut-away shape.

The exemplary embodiment has illustrated the example where coils U11 to U41 are integrated with bus bar 51, coils V12 to V42 are integrated with bus bar 52, and coils W11 to W41 are integrated with bus bar 53. However, the coils may be respectively attached to the bus bars through fusing or welding, for example, to correspond to coil shapes.

In the exemplary embodiment, refrigerant C flows in hollow part 2a of shaft 2. For example, refrigerant C may circulate and flow in a space between rotor 3 and stator 4. Refrigerant C to be used can be liquid such as oil or water, for example. When liquid is used as refrigerant C, effects of cooling coils 5A further increase.

INDUSTRIAL APPLICABILITY

The motor according to the present disclosure increases effects of cooling the coils with refrigerant. Therefore, the present disclosure effectively achieves a low cost but highly efficient motor.

REFERENCE MARKS IN THE DRAWINGS

1: motor
2: shaft
2a: hollow part
2b: through hole
3: rotor
4: stator
5A: coil
31: magnet
41: stator core
42: teeth
43: slot
51 to 54: bus bar
60A to 60D: corner of coil 5A
61: opposing surface
62: opposing surface
63: recess
A1 to A6: cross section at turn of coil 5A
C: refrigerant
U11, U22, U32, U41, V12, V21, V31, V42, W11, W22, W32, W41: coil

The invention claimed is:

1. A motor comprising:
a shaft;
a rotor being provided to abut an outer circumference of the shaft; and
a stator being disposed outside of the rotor to be away from the rotor at a certain gap, the stator including:
a stator core having an annular shape;
teeth respectively protruding from the stator core toward the rotor in a radial direction; and
coils respectively wound onto the teeth n (n is an integer of 1 or greater) turns including first to n-th turns,
wherein the shaft includes a hollow part serving as a passage for refrigerant used to cool the inside of the motor,
the coils are each configured by winding a conductive member having a polygonal cross section onto the teeth, the polygonal cross section being orthogonal to longer direction of the shaft,
each of the coils includes a cut-away part on at least either a first opposing surface or a second opposing surface, the cut-away part having a shape being cut away so as to extend in the longer direction of the shaft, the first opposing surface representing an opposing surface to a side surface of a corresponding one of the teeth, and the second opposing surface representing an opposing surface to a corresponding one of the coils, and
the corresponding one of the coils being wound onto an adjacent one of the teeth, and
wherein at least a turn being closest to the stator core is only provided with the cut-away part, and the cut-away part and at least either the first opposing surface or the second opposing surface define a space allowing the refrigerant used for cooling the coils to pass through.

2. The motor according to claim 1, wherein at least one of corners of a k-th (k is an integer, 1≤k≤n) turn of each of the coils has a cut-away part to provide the recess.

3. The motor according to claim 1, wherein at least a center portion of the first opposing surface or a center portion of the second opposing surface of the k-th (k is an integer, 1≤k≤n) turn of each of the coils has a cut-away shape to provide the recess.

4. The motor according to claim 1, wherein at least two of the turns of each of the coils are respectively provided with the recesses.

5. The motor according to claim 1, wherein each of the turns of each of the coils at least lies adjacent to the stator core, and is provided with the recess.

6. The motor according to claim 1, wherein the second opposing surface of each of the turns of each of the coils is provided with a plurality of the recesses.

7. The motor according to claim 1, wherein the refrigerant is liquid.

* * * * *